(12) United States Patent
Mai et al.

(10) Patent No.: US 12,393,757 B2
(45) Date of Patent: Aug. 19, 2025

(54) TOP DOWN PHYSICAL DESIGN OF SOFT EMBEDDED FIELD PROGRAMMABLE GATE ARRAY (FPGA) FABRICS

(71) Applicant: CARNEGIE MELLON UNIVERSITY, Pittsburgh, PA (US)

(72) Inventors: Kenneth W. Mai, Pittsburgh, PA (US); Prashanth Mohan, Pittsburgh, PA (US); Ahmet Oguz Atli, Pittsburgh, PA (US); Ogen Onur Kibar, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 422 days.

(21) Appl. No.: 17/870,953

(22) Filed: Jul. 22, 2022

(65) Prior Publication Data

US 2025/0131174 A1 Apr. 24, 2025

Related U.S. Application Data

(60) Provisional application No. 63/224,560, filed on Jul. 22, 2021.

(51) Int. Cl.
*G06F 30/347* (2020.01)
(52) U.S. Cl.
CPC ................. *G06F 30/347* (2020.01)
(58) Field of Classification Search
CPC ....................................... G06F 30/347

USPC .......................................... 716/116
See application file for complete search history.

(56) References Cited

U.S. PATENT DOCUMENTS

| | | | |
|---|---|---|---|
| 10,523,209 B1* | 12/2019 | Wang | H03K 19/1737 |
| 11,029,958 B1* | 6/2021 | Zhang | G06F 9/3016 |
| 2002/0073380 A1* | 6/2002 | Cooke | G06F 30/30 716/102 |
| 2019/0303147 A1* | 10/2019 | Brewer | G06F 9/52 |
| 2019/0303263 A1* | 10/2019 | Fleming, Jr. | G06F 11/3024 |
| 2021/0064435 A1* | 3/2021 | Brewer | G06F 9/5016 |
| 2021/0083673 A1* | 3/2021 | Sechen | H03K 19/1776 |
| 2021/0200540 A1* | 7/2021 | Chofleming | G06F 15/80 |
| 2022/0100680 A1* | 3/2022 | Chrysos | G06F 13/4027 |
| 2022/0196796 A1* | 6/2022 | Fiore | G01S 13/581 |

* cited by examiner

*Primary Examiner* — Jack Chiang
*Assistant Examiner* — Suchin Parihar
(74) *Attorney, Agent, or Firm* — KDW FIRM PLLC (57) ABSTRACT

Disclosed herein is a method for performing top-down design for optimizing synthesizable FPGA fabrics which eliminates the need for floorplanning and manual buffering by providing a global timing view of the FPGA fabric to the electronic design automation (EDA) tools. This is accomplished by providing the EDA tools with a global timing view spanning multiple tiles. The method restructures the switch-box muliplexers in a unique way to enable the use of powerful static timing analysis (STA) exceptions supported by modern EDA tools to work around the problem of combinational loops and long false paths created by the interconnect mesh in the FPGA fabric.

11 Claims, 12 Drawing Sheets
(12 of 12 Drawing Sheet(s) Filed in Color)

```xml
<switchblocklist>
    <switchblock name="wilturn_turn" type="unidir">
        ...
        <wireconn num_conns="to" from_type="L2" to_type="L2" .../>
        <wireconn num_conns="to" from_type="L4g" to_type="L4g" ...>
        <wireconn num_conns="to" from_type="L4g" to_type="L2" ...>
    </switchblock>

<switchblock name="wilturn_straight" type="unidir">
        ...
        <wireconn num_conns="to" from_type="L2" to_type="L2" .../>
        <wireconn num_conns="to" from_type="L4g" to_type="L4g" .../>
    </switchblock>
</switchblocklist>

<segmentlist>
  <segment name="L4g" freq="0.30" length="4" type="unidir" ...>
    <mux name="l4"/>
      <sb type="pattern">1 1 1 1 1</sb>
      <cb type="pattern">1 0 0 1</cb>
  </segment>
  <segment name="L2" freq="0.70" length="2" type="unidir" ...>
    <mux name="l2"/>
      <sb type="pattern">1 1 1</sb>
      <cb type="pattern">1 1</cb>
  </segment>
</segmentlist>
```

FIG. 6

```
1  # Create the configuration and functional clocks
2  create_clock -name "conf_scan_clk" -period 5000 [get_ports "io_scanClk"]
3  create_clock -name "clock" -period 850 [get_ports "clock"]
4  set_clock_groups -name ASYNCG -asynchronous -group "clock" -group "conf_scan_clk"
5  set_clock_uncertainty 100 [get_clocks *]
6
7  # Apply loop breaking exceptions at switch blocks (SB)
8  set_case_analysis 1 loopBreak_0 # SB CHAN-X+ (right)
9  set_case_analysis 1 loopBreak_1 # SB CHAN-X- (left)
10 set_case_analysis 1 loopBreak_2 # SB CHAN-Y+ (top)
11 set_case_analysis 1 loopBreak_3 # SB CHAN-Y- (bottom)
12 set_case_analysis 1 loopBreak_4 # INTRA CLB LOOP
13
14 # L0 intra-clb feedback path adjustment to reduce the delay to (520ps)
15 set_path_adjust_group -name L0 -from *Ble_regs* -through *Clb*/lb8ux*
16 set_path_adjust -path_adjust_group L0 -setup -230
17 # Equivalent to: set_max_delay -from *Ble_regs* -through *Clb*/*lb8ux* 520
18
19 # L2 path delay is defined by clock period & uncertainty (750ps)
20
21 # L4 path adjustment to increase L4 delay by 80ps to 830ps
22 set_path_adjust_group -name L0 -from *Ble_regs* -through *L4_SB* -to *Ble_regs*
23 set_path_adjust -path_adjust_group L0 -setup 80
```

FIG. 7

```
1  for {set y 0} {$y <= $ytiles} { incr y} {
2    for {set x 0 } {$x <= $xtiles} {incr x} {
3      set grp_name "Tile_$(x)_$(y)"
4      # Create a cluster without specifying physical location on die
5      if { [llength [get_db groups $grp_name]] == 0 } {
6        create_group -name $grp_name -type cluster
7      }
8      update_group -name $grp_name -add -objs "MuxScanSCA/Mux_Tile_$(x)_$(y)_*"
9    }
10 }
```

TOP DOWN PHYSICAL DESIGN OF SOFT EMBEDDED FIELD PROGRAMMABLE GATE ARRAY (FPGA) FABRICS

RELATED APPLICATIONS

This application claims the benefit of U.S. Provisional Patent Application No. 63/224,560 filed Jul. 22 2021, the contents of which are incorporated herein in their entirety.

GOVERNMENT INTEREST

This invention was made with United States government support under contract FA8650-18-1-7818 awarded by the U.S. Air Force Research Laboratory and contract DE-NA0003525 awarded by the U.S. Department of Energy. The U.S. government has certain rights in the invention.

BACKGROUND OF THE INVENTION

Embedded field-programmable gate array (eFPGA) fabrics are finding increasing use in modern System-on-Chip (SoC) designs, as their programmability can be leveraged not only to accelerate a variety of workloads but also to enable upgradability, feature addition, and security. With technology scaling, designing hard eFPGA fabrics using full-custom layout techniques requires extensive design time/effort with poor process portability and is not compatible with typical SoC design schedules.

On the other hand, soft eFPGA fabrics described by a register transfer level (RTL) design abstraction and designed using standard-cells can significantly speed up the eFPGA design cycle and provide effortless process portability.

Adding programmability into large SoC designs enables a number of advantages including upgradability, feature addition, bug fixes, and security. eFPGA fabrics are an efficient method of implementing this programmability, especially when larger logic blocks are needed. In stand-alone FPGA chips, the logic fabric is usually designed in a "hard" fashion using custom layout and process-specific features for maximum density, energy efficiency, and performance. However, this requires extensive design time/effort and has poor process portability, which are not compatible with typical SoC design schedules, budgets, and fab diversity needs.

Thus, "soft" eFPGA implementations that specify the eFPGA fabric in RTL and use the conventional standard-cell synthesis based CAD tool flow to implement the physical design are more appropriate for many SoC designs.

Synthesizable FPGA fabrics are typically built using a bottom-up methodology where individual tiles are synthesized in isolation and later stitched together to generate the large FPGA fabric. While the bottom-up design methodology is capable of synthesizing individual tiles for a performance target using electronic design automation (EDA) tools, ensuring fabric-level performance targets is difficult due to the lack of a global timing view across multiple tiles.

This issue is currently addressed on synthesizable FPGA fabrics with a combination of floorplanning, to enforce a structured placement of the tiles in the fabric, and manual buffer insertion, to deal with interconnecting wires spanning multiple tiles. While it is possible to synthesize FPGA fabrics using this approach, floorplanning and manual buffering requirements make it difficult to intermix synthesized FPGA fabrics and application-specific integrated circuit (ASIC) blocks with ease. Manually inserting buffers to guarantee a maximum delay through channels across multiple tiles is very difficult, especially in advanced technology nodes (e.g., 28 nm and below) where the wire loads can vary significantly based on the length of the wire segment, metal layer used for routing, and coupling capacitance with adjacent routing.

SUMMARY OF THE INVENTION

Disclosed herein is a method for performing top-down design for optimizing synthesizable FPGA fabrics which eliminates the need for floorplanning and manual buffering by providing a global timing view of the FPGA fabric to the electronic design automation (EDA) tools. This is accomplished by providing the EDA tools with a global timing view spanning multiple tiles. The method restructures the switch-box muliplexers in a unique way to enable the use of powerful static timing analysis (STA) exceptions supported by modern EDA tools to work around the problem of combinational loops and long false paths created by the interconnect mesh in the FPGA fabric.

The resulting global timing view can be used to optimize the FPGA fabric as a flat entity similar to the standard push-button ASIC design flow, eliminating the need for manual buffering and floorplanning restrictions imposed by the bottom-up design methodology.

The method disclosed herein is compatible with standard ASIC flows, which simplifies and accelerates the optimization and design space exploration of soft FPGA fabrics. It also enables new uses for eFPGA fabrics that utilize tight integration of reconfigurable logic with hardwired blocks, such as hardware obfuscation.

The invention includes a push-button FPGA Verilog RTL and STA constraints generator which, in one embodiment, may be implemented using Chisel, a high-level hardware construction language. The generator takes in the FPGA architecture description file supported by the open-source Verilog-To-Routing (VTR) tool and produces tape-out ready RTL and STA constraints for use in any process technology with a standard-cell library.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Various solutions have been proposed to address the problem of combinational loops discussed above. One approach to overcome this problem is to design FPGA interconnect architectures that avoid combinational loops by trading off interconnect flexibility for the ability to synthesize FPGA fabrics using EDA tools. An alternate approach, which avoids architecture modifications to overcome the synthesis problem is to break down the FPGA fabrics into regular tiles, primarily composed of multiplexers and configuration storage cells. Hence, it is feasible to generate the structural netlist containing standard cells and bypass the behavioral synthesis process altogether. These structurally generated tiles can then be assembled to create the large FPGA fabric, in a bottom-up fashion.

Figure 1A:
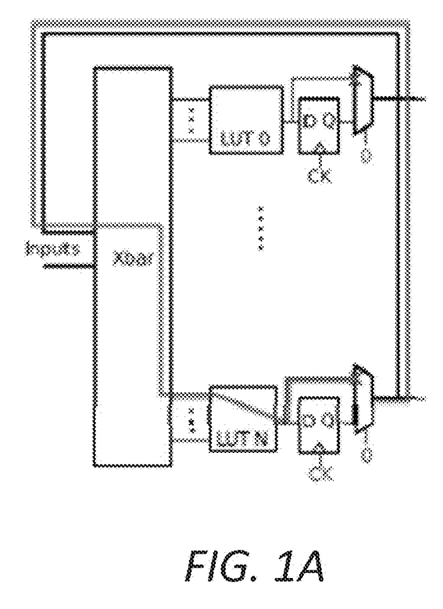
FIG. 1A is a schematic diagram showing the breaking of combinational loops inside the FPGA.

The problem of not being able to synthesize the FPGA from a behavioral hardware description langiage (e.g., Verilog) can be overcome using the rich syntax of Static Timing Analysis (STA) exceptions provided by the EDA tools. Using the STA exceptions, the combinational loops can be broken in a targeted manner while retaining the majority of the valid timing paths at a tile level as illustrated in FIG. 1A. This approach enables the synthesis of bidirectional routing architecture from behavioral hardware description language without the need for structural hardware description language generation. The same idea can be extended to synthesize FPGA architectures with different performance targets by modifying the timing targets with STA constraints. While these approaches address the problem of breaking the loops at the tile level for synthesizing FPGA fabrics, they still employ a bottom-up approach to synthesis where the tiles are combined to create the large FPGA fabric.

Figure 1B:
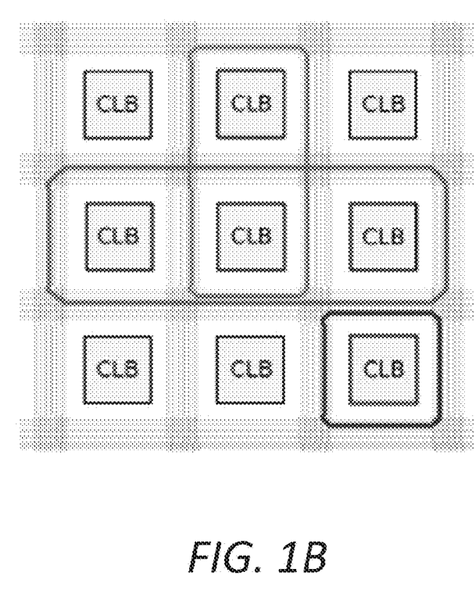
FIG. 1B shows that inter-tile combinational loop can form in the FPGA fabric even after breaking inter-tile loops.

In the bottom-up approach, the process of integrating multiple tiles creates new combinational loops, as shown in FIG. 1B, which impedes the optimization of channel wires that run across the FPGA fabric. While it is possible to break these timing loops by disabling all timing through the output channels of the tiles, it results in the loss of a global timing view that would have been helpful to optimize the timing paths through channel wires connecting multiple tiles. This problem has been alleviated to some extent by using a manual buffering approach in combination with floorplanning requirements to enforce a regular structural placement of tiles, which also helps with estimating the wire lengths to facilitate manual buffering.

The present invention uses an alternative automated solution to the problem of combinational loops spanning multiple tiles by restructuring the switch-box multiplexers to enable a top-down push-button standard ASIC design methodology without the need for manually buffering channel wires and specifying floorplanning regions.

Figure 2:
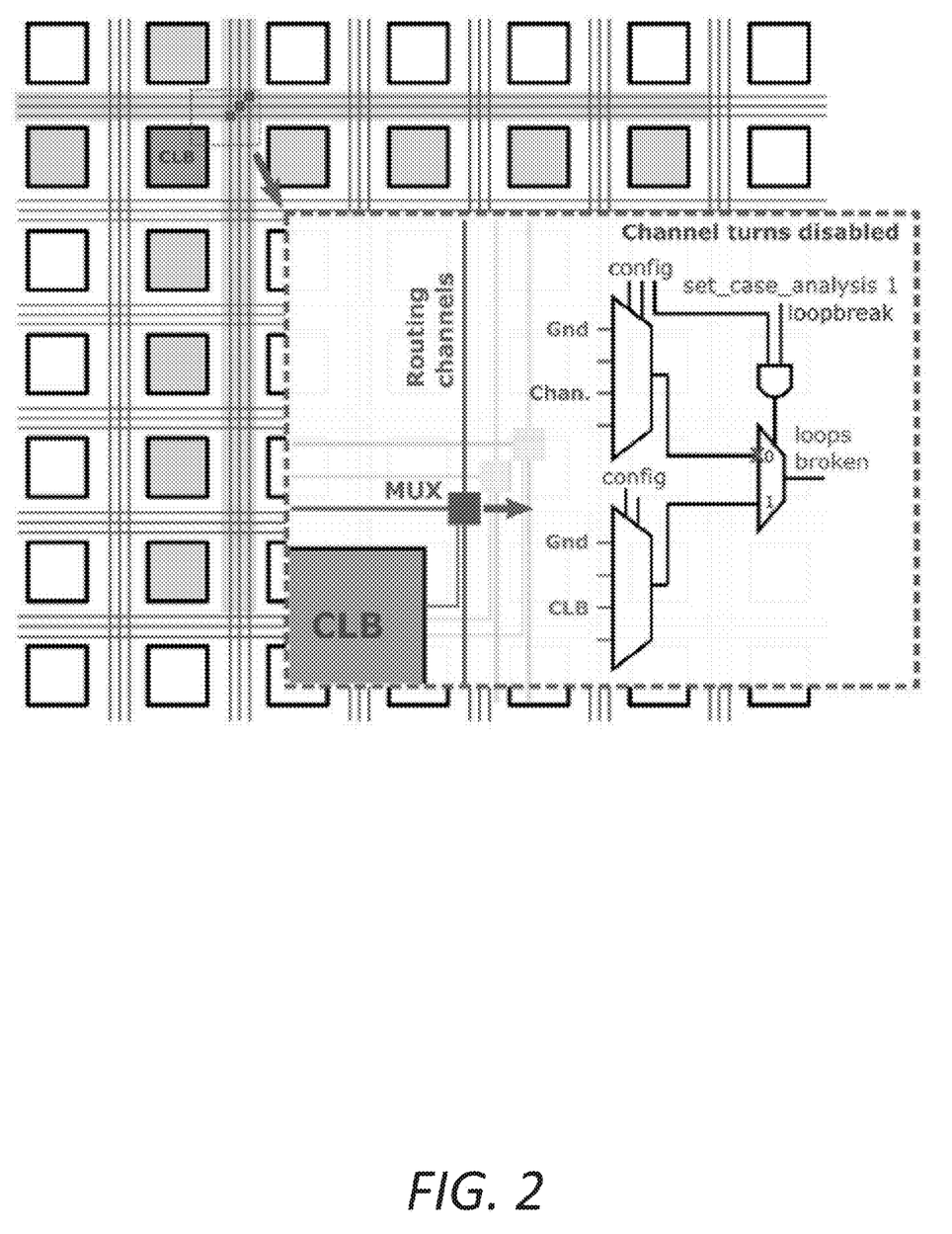
FIG. 2 is a schematic diagram showing the partitioning of CLB and channel inputs into separate multiplexers.

Combinational loops across multiple tiles exist because the timing arcs through the switch box muxes enable the timing path to turn in all three directions which eventually results in a loop. The switch-box muxes receive inputs from both channels and Flip-Flop (FF) of the Configurable Logic Block (CLB) output pins, as shown in FIG. 2.

If only the timing paths going through the channels can be blocked, while retaining the timing paths spanning across CLB FFs of multiple tiles, the formation of combinational loops can be avoided. FIG. 2 shows a specific arrangement of the switch-box multiplexer, which partitions the CLB output pins and channel wires to enable the use of case analysis timing exceptions to block all timing paths through channel wires. The case analysis exception acts as a filter for the timing paths, only letting the paths that correspond to a select bit value (0 in this case) propagated by the case analysis statement.

The modified switch block multiplexer partitions CLB and channel inputs into separate multiplexers. The case analysis exception is used on the loop break input to block all channel→channel paths to disable all timing loops in the FPGA routing fabric. This arrangement retains all the timing paths originating from CLB outputs. Therefore, all the CLB→CLB paths and the routing channels on these paths will be optimized even after breaking the loops.

While it is theoretically possible to break the loops by disabling just the channel wires in one direction (e.g., bottom/top to left), such an approach will result in timing paths of vastly different lengths, spanning the entire FPGA resulting in the timing path explosion problem. Hence, optimizing all of the timing paths under a single delay constraint will become infeasible with this approach. As a result, the loops in the switch-box muxes driving the channel wires in all directions must be broken to preset a uniform timing path for optimization. Even though the paths that take a turn inside a switch block are not being explicitly optimized, the delay through these turns can be reduced by clustering the switch block muxes of a tile close to each other without explicitly specifying their locations. The place and route EDA tools have specific commands to cluster a group of cells without specifying a particular location. The tool can also be instructed to buffer these turns using a tighter max transition constraint. Using a combination of case analysis exceptions and location-agnostic clustering, we can present a global timing view of the FPGA fabric to the EDA tools and eliminate the need for manual buffering and floorplanning while providing equal or better performance.

The top-down methodology offers three advantages compared to the bottom-up method. First, it provides a push-button design flow for FPGA fabrics. Second, the timing constraints on channel wires can provide regularity in delay for long wires spanning multiple tiles. Third, the global timing view automatically optimizes the FPGA fabric while providing similar or better performance than the bottom-up approach, requiring tuning the buffering and floorplanning strategy. These advantages create an attractive proposition to intermix small embedded FPGA fabrics with ASIC at the RTL level in a single push-button flow without creating a separate eFPGA hard IP for integration.

Figure 3:
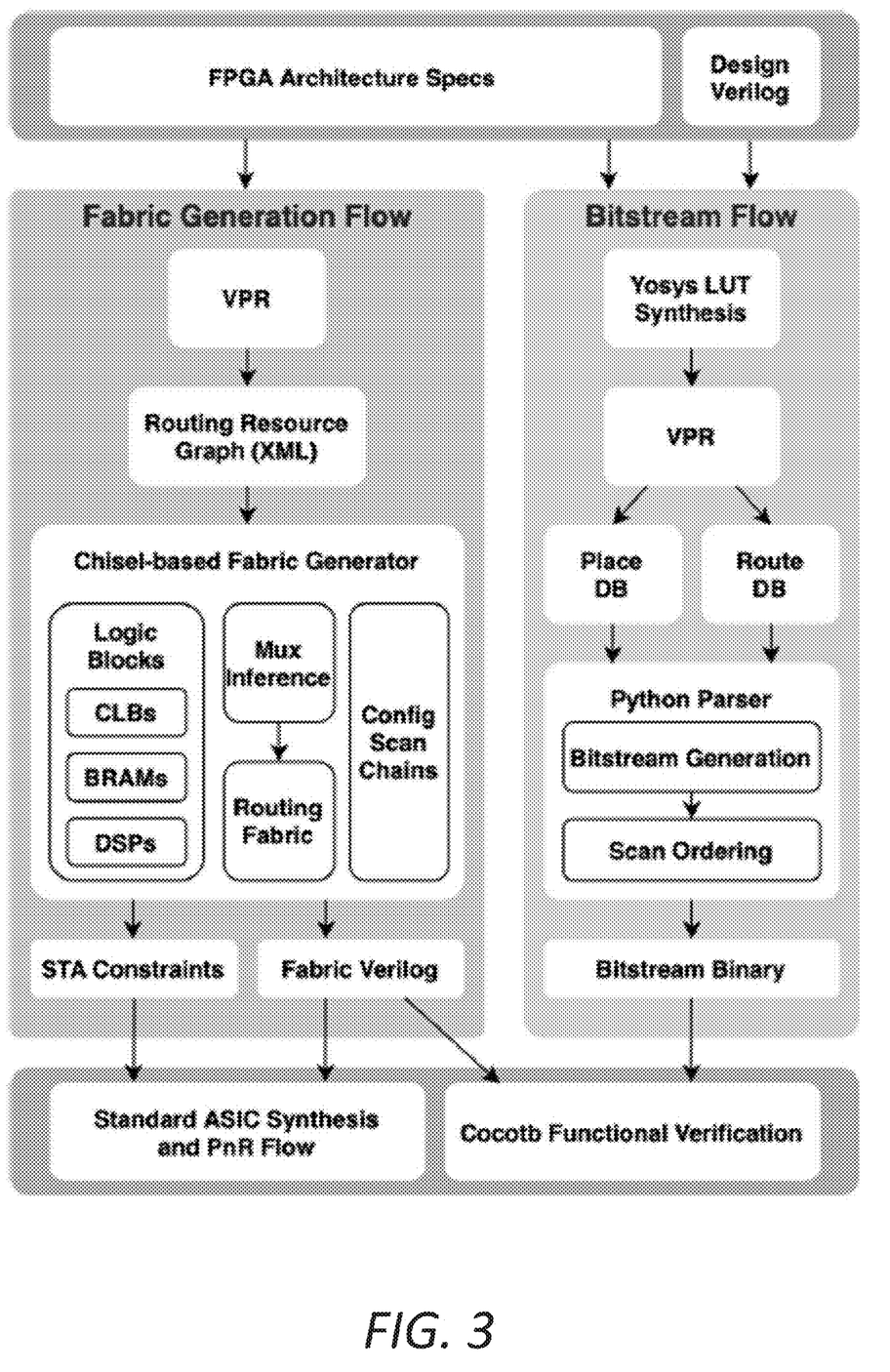
FIG. 3 is a block diagram showing the design flow depicting fabric RTL generation and verification.

To realize soft eFPGAs designed using a top-down design methodology in silicon, the invention includes a soft eFPGA design flow that starts from the architecture specification of the eFPGA fabric using VTR to generate the GDSII layout. An overview of the FPGA fabric generation and verification flow is shown in FIG. 3. The fabric generation flow takes in the FPGA architecture described using the VTR architecture specification format as the input. This architecture description is fed to the FPGA PnR tool VPR, which generates a the routing resources (RR) graph in XML format that describes the organization of the complex logic blocks in the FPGA along with all the interconnections in the routing fabric. The push-button FPGA generator can infer the FPGA structural data from the RR graph XML and generate hardware description language (e.g., Verilog) RTL for fabrics of various CLB array sizes and routing channel widths. While inferring the node connections from the RR graph to generate the routing fabric, the generator identifies and restructures all the switch box muxes and outputs the necessary case analysis exceptions needed by the top-down design methodology for interfacing with the downstream standard ASIC synthesis and PnR flow. The generator also inserts the configuration FFs split across multiple scan chains and outputs a scan ordering file that describes the bitstream structure.

The first step in the bitstream generation flow is to synthesize the RTL representation of the sample design into a blif netlist of 6-input look-up tables (LUTs) and FFs using the open source synthesis tool (e.g., Yosys). The resulting netlist and the architecture description file of the desired FPGA fabric is fed to VPR, which generates placement and routing databases that describes the placement and routing information for the sample design. These databases are parsed by the bitstream generation Python scripts, which infer the configuration bits for all the muxes and LUTs in the design. The bitstream generator organizes the configuration bits into a binary bitstream format in accordance with the scan ordering file generated by the fabric generator. The resulting bitstream file can be used to verify the FPGA RTL, and simulate sample designs on the FPGA. To ease the verification process of the eFPGA RTL, testing can be performed using cocotb, a Python testbench environment that converts a Python front-end script into HDL simulator directives. The soft eFPGA design flow mirrors the standard ASIC design flow.

Front-end Flow—The invention mainly focuses on island-style eFPGA architectures as this is the most commonly used FPGA architecture and is also well supported by open source tools such as VTR. VTR can generate a wide range of eFPGA fabrics from an architecture specification format. As such, VTR is used as the basis for the soft eFPGA generator. An overview of the VPR architecture specification will not be discussed, identifying the various features supported by the generator. VTR uses an XML file that contains a set of tags to describe the contents of the complex logic blocks and the routing architecture of the FPGA fabric.

Figure 4:
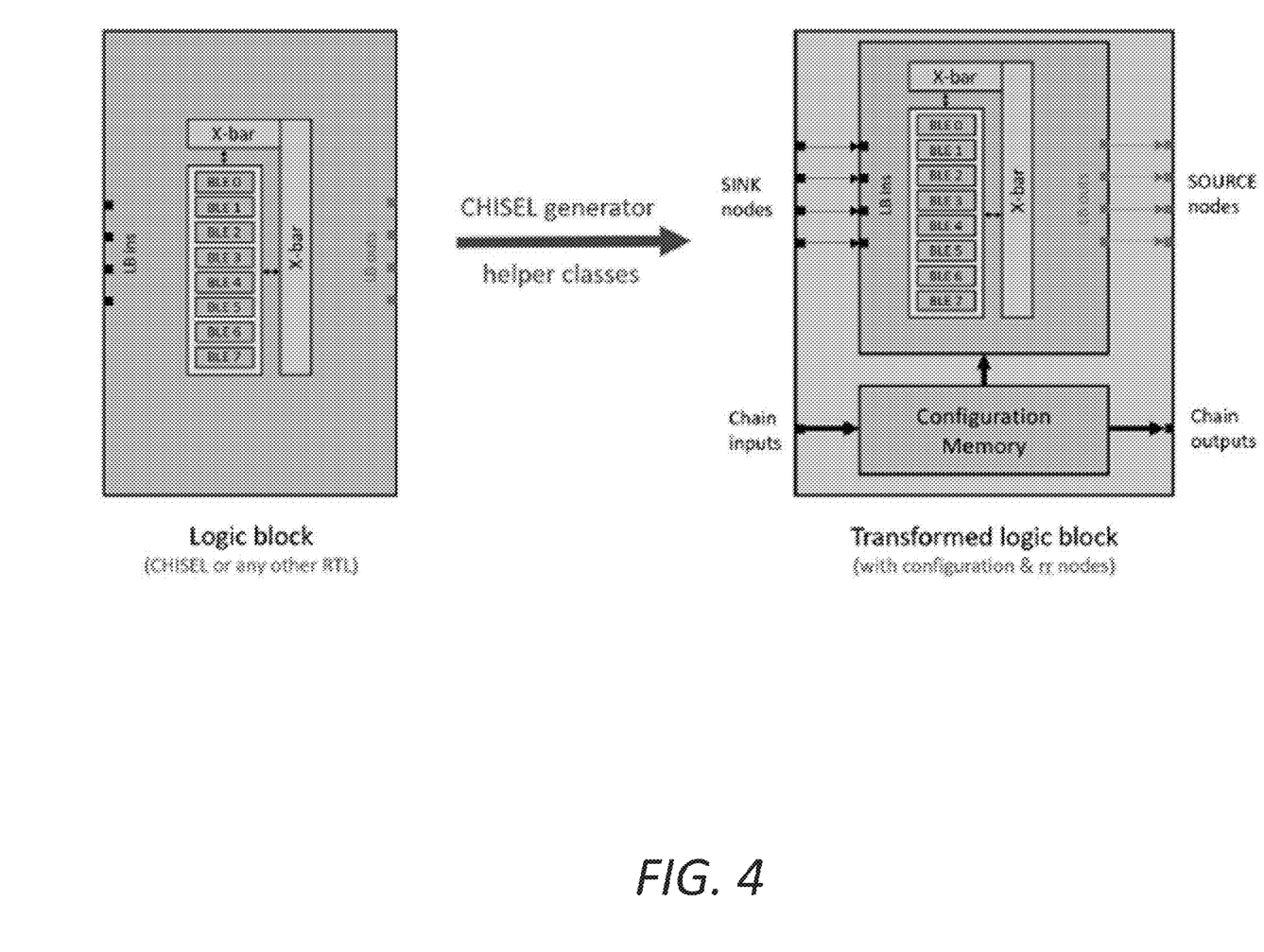
FIG. 4 is a block diagram showing helper classes in the generator to facilitate the addition of a standardized configuration memory interface and expose the inputs and outputs of the logic block.

Logic Block Architecture-Logic blocks in the FPGA are described using the <models> and <complexblocklist> tags. The <models> tag contains various primitives in the FPGA fabric, such as registers, adders, memories, etc. The <complexblocklist> tag contains logic blocks of different primitives described in the <models> tag. Typical logic blocks include configurable (CLB), digital signal processing (DSP) blocks, block RAMs, etc. Though these logic blocks vary significantly in their implementation, VPR provides a nice abstraction for integrating different complex logic blocks into the FPGA routing fabric at the level of inputs and output of the logic block, as shown in FIG. 4.

Helper classes are provided in the generator to aid the RTL generation of the logic blocks described in the VPR architecture file. The basic idea of the helper classes is to facilitate the addition of a standardized configuration memory interface and expose the inputs and outputs of the logic block in a form that can be directly instantiated into the routing fabric, as shown in FIG. 4. The logic blocks can be implemented in CHISEL or imported from an external RTL description. This approach allows the incorporation of any custom logic block into the eFPGA fabric and the accumulation of an extensive library of logic blocks over time.

Routing Architecture—VPR uses several tags to describe the FPGA grid, the routing channels, and their connections to the various logic blocks in the fabric. The <tiles> tag contains the physical tiles present in the FPGA. Moreover, it describes how complex block inputs and outputs connect to the routing channels in the FPGA. The <layout> tag specifies the size of the FPGA grid and the tiles present in each of the grid locations. The <device> tag specifies the type of switches used for connection and switch blocks and defines the switch block architecture used by the routing fabric. The <segmentlist> tag contains the length and number of routing segments present in the horizontal and vertical routing channels.

VPR generates a routing resource graph, or rrgraph, that models the FPGA routing fabric as a set of nodes and edges based on the architecture specification. The rrgraph abstracts away the internal implementation details of the logic blocks and only exposes the inputs and outputs. The rrgraph contains five different nodes: IPIN, OPIN, SOURCE, SINK, and CHAN (X/Y). SOURCE and SINK form the inputs and outputs of the connection block. IPIN connects signals from the routing fabric to SINK nodes, and OPINS connects the SOURCE of the logic blocks to the routing fabric. The CHANX and CHANY nodes represent the wire segments in the horizontal and vertical routing channels, respectively. IPINs usually correspond to connection blocks, and OPINs generally connect to switch blocks that drive the CHAN (X/Y) nodes.

The generator supports all the routing architecture features that eventually get translated to nodes and edges in the rrgraph. Because the rrgraph is used to generate the routing fabric flatly, a wide variety of VTR routing architecture specifications can be generated which include: (1) Any switch block (wilton, subset, custom, etc.); (2) unidirectional channels with wire segments of various lengths (local, semi-global, global); (3) all connection block and switch block connectivity (fc) parameters; and (4) direct connections Configuration Architecture—The configuration memory forms a significant portion of the FPGA fabric, and its implementation has implications on various factors such as area efficiency, configuration speed, power consumption, etc. Moreover, different applications may require specific features related to configuration memory management, such as configuration readout, partial reconfiguration, configuration scrubbing, etc. Therefore it is essential to consider all these factors in deciding the configuration architecture of the soft eFPGA fabric. In the context of a soft eFPGA, the configuration memory must be implemented using memory elements present in the standard cell library. Most standard cell libraries provide flip-flops (FF) or latch as memory storage elements. There are different ways to implement configuration memories using FFs and latches and various tradeoffs exist between the different configurations.

Latch-based configurations offer the best area trade-off, but this approach has some significant drawbacks. First, the value written to latches cannot be read out for the lowest area implementation. Hence, there is no way to test if the latches work properly without inserting additional scan chains or writing to other latches to propagate the stored value to the output. Having limited observability is a highly undesirable and risky strategy, and the area savings of 10% nay not be worth the risk. If latches must be used, the latch+mux combination with a higher area than simple FF-based scan chains must be used. Secondly, latch-based solutions are not readily compatible with ASIC ATPG tools. Hence ATPG patterns have to be generated manually and used for verification. This is not a significant problem in research projects, but ATPG is crucial for commercial applications. Third, latches cannot be connected in a simple chain-like fashion. They have to be organized into arrays like memory, and this creates much greater entanglement with the physical layout and increases routing utilization by at least 2× compared to scan chains. While it is undoubtedly possible to carefully plan the configuration assignment to reduce routing congestion, this introduces an additional layer of complexity when the eFPGA architecture is changed or ported to new technology with a different metal stack.

The easiest way to include configuration memories in the eFPGA is to use a series of scan chains. The most significant advantage of using a scan chain for soft eFPGA is that it decouples the physical implementation from the logical implementation. The flops in the chain are kept local and not randomly connected across hierarchies. This is easily achievable in the eFPGA RTL generator as the entire architecture is already known. Logic blocks, connection blocks, and switch blocks in a tile will likely not be spread over a large area. Another significant advantage, especially in using the fabric in SoC, is that ASIC ATPG tools can be used to generate the test patterns without any extra effort. Moreover, scan chains can operate faster and support important features such as readout, partial reconfiguration, and live reconfiguration with lower complexity and overhead than latches. Therefore, scan-based configurations are a great fit, especially for soft eFPGA fabrics. All forms of scan-based configuration memory architectures are supported in the generator.

Figure 5:
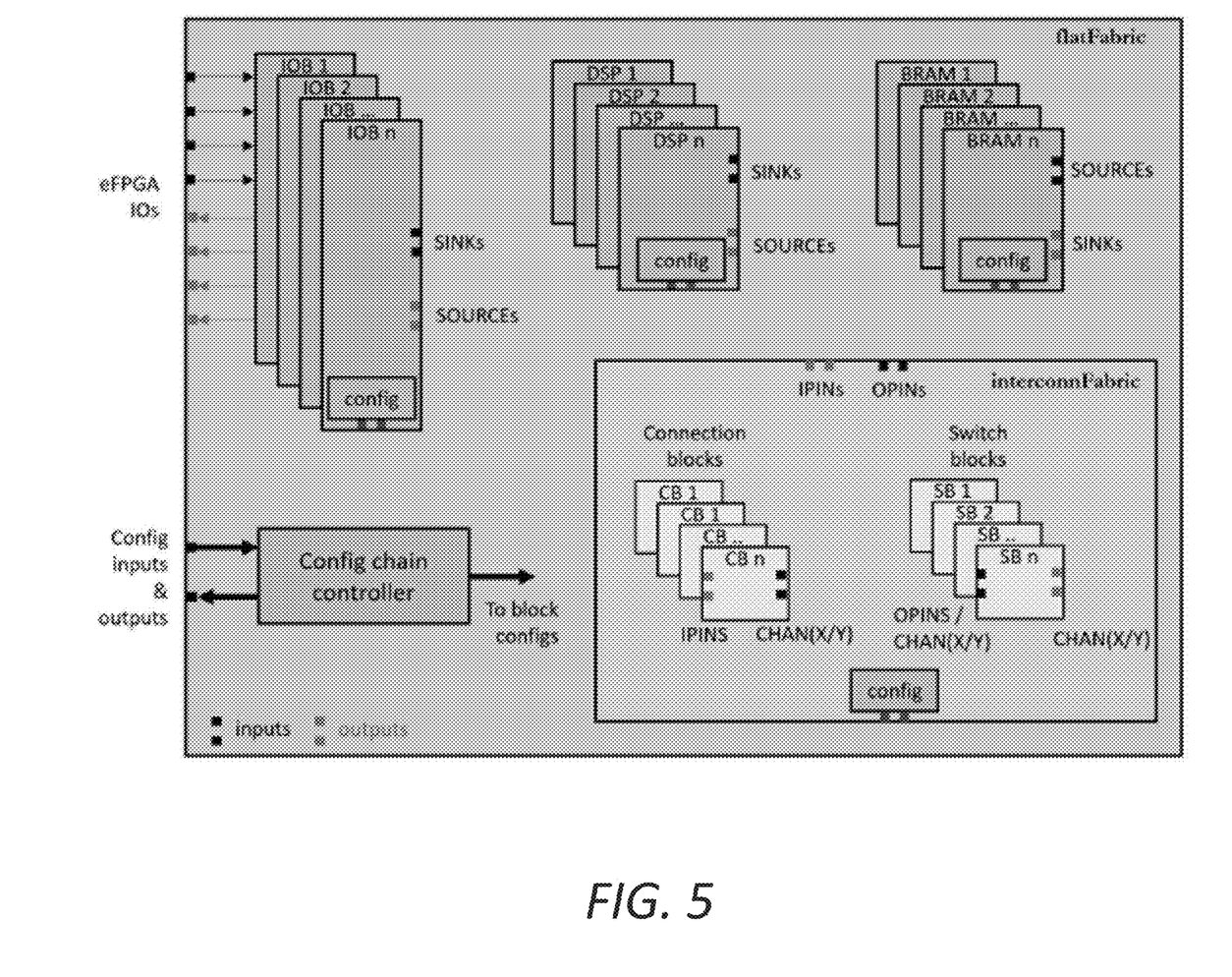
FIG. 5 is a block diagram showing the hierarchy of the RTL modules generated by the fabric generator.

Soft eFPGA RTL Organization—The RTL generated by the generator is organized into multiple hierarchies as shown in FIG. 5. The top-level hierarchy is called flatFabric, and it contains all the logic blocks and the routing fabric hierarchy, called interconnFabric. The routing fabric has all the switch blocks and connection blocks in the FGPA as individual hierarchies. The RTL generator connects the logic blocks IOs, connection blocks, and switch blocks in accordance with the VPR routing resource graph. The generated RTL also connects all the configuration chains in each logic block and the routing fabric. The IO block pins are connected to external ports. Another feature of the generator is that every connection box and switch block can be labelled with the VPR graph node details such as its node id, tile location, type of the node, etc. This is extremely helpful in comparing a physical implementation with VPR GUI for debugging purposes.

Apart from FPGA IOs, a configuration controller with a small JTAG like FSM can load the bitstream into the correct configuration scan chains. The scan chains in the FPGA are typically split into multiple chains to reduce the power consumption during configuration. The configuration controller also exposes the loopBreak signal described in the top-down methodology. LoopBreak signals can be controlled externally or by the configuration controller to ensure that there are no ring oscillators created in the fabric during reconfiguration or when the eFPGA is initially powered on. The configuration controller also drives another signal, called gndNodes. This signal ensures that all the logic block and io block outputs can be tied to logic 0 during reconfiguration to avoid unnecessary switching in the fabric. At this stage, the fabric RTL is ready for the back-end flow.

Back-End Flow—The RTL generated in the front-end flow must be augmented by the timing constraints file and the technical library to proceed through the back-end flow. The major challenge in the synthesis and physical implementation of the eFPGA fabric revolves around timing optimization of the highly interconnected routing fabric. The RTL of a 10×10 eFPGA fabric is used as an example to walk through the back-end flow and implement the fabric on an industrial 22 nm FinFET process technology with a compact 6T standard cell library.

Exemplary 10×10 eFPGA Architecture

The architectural specification of the eFPGA fabric used is shown in Table 1. The eFPGA fabric comprises CLBs with 4-LUTs, a 50% sparse local cross-bar, and two different wire segments (local and semi-global) of lengths 2 and 4, respectively.

This specific architecture was chosen to illustrate the flexibility of the top-down methodology adapt to multiple wire segments and custom switch block types.

TABLE 1

| Parameter | Value |
|---|---|
| N, Number of LUTs per logic block | 8 |
| K, LUT size | 4 |
| Crossbar connectivity | 50% |
| W, Channel width | 80 |
| Wire lengths | L4 (30%), L2 (70%) |
| Fs Switch block connectivity | 3 |
| Switch block type | Wilton |
| Fcin, Input connectivity | 0.25 |
| Fcout, Output connectivity | 0.3 |

Figure 6:
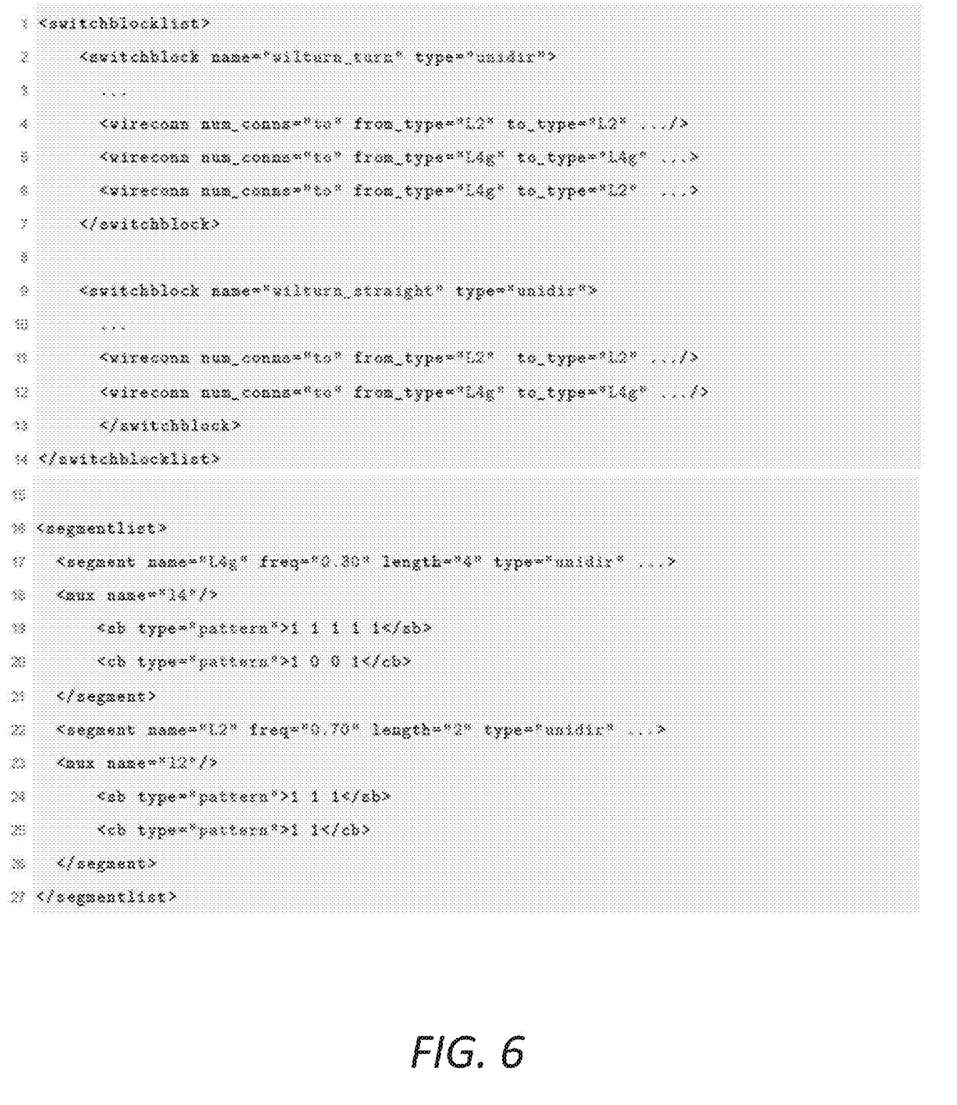
FIG. 6 is a listing showing switch block and wire segment specifications for the exemplary 10×10 eFPGA fabric.

The exact switch-box and wire segment specifications are shown in the listing in FIG. 6. The delay of these wire segments and their interconnections after placement and routing ewill now be discussed. The wireconn statements define how the local and semi-global wires connect inside the switch block. The local L2 segment connects to other L2 segments, and the semi-global L4 segment connects to both L2 and L4 segments. For straight connections that do not turn, the L2 and L4 connect to other L2 and L4 segments. The local L2 wires make connections to all connections blocks and switch blocks it can reach. But the semi-global L4 wires get inputs from connection blocks and can drive switch blocks and connection blocks only at the ends of the wire segment, 4 tiles apart, to reduce the load and hence the delay on the longer semi-global wires.

Figure 7:
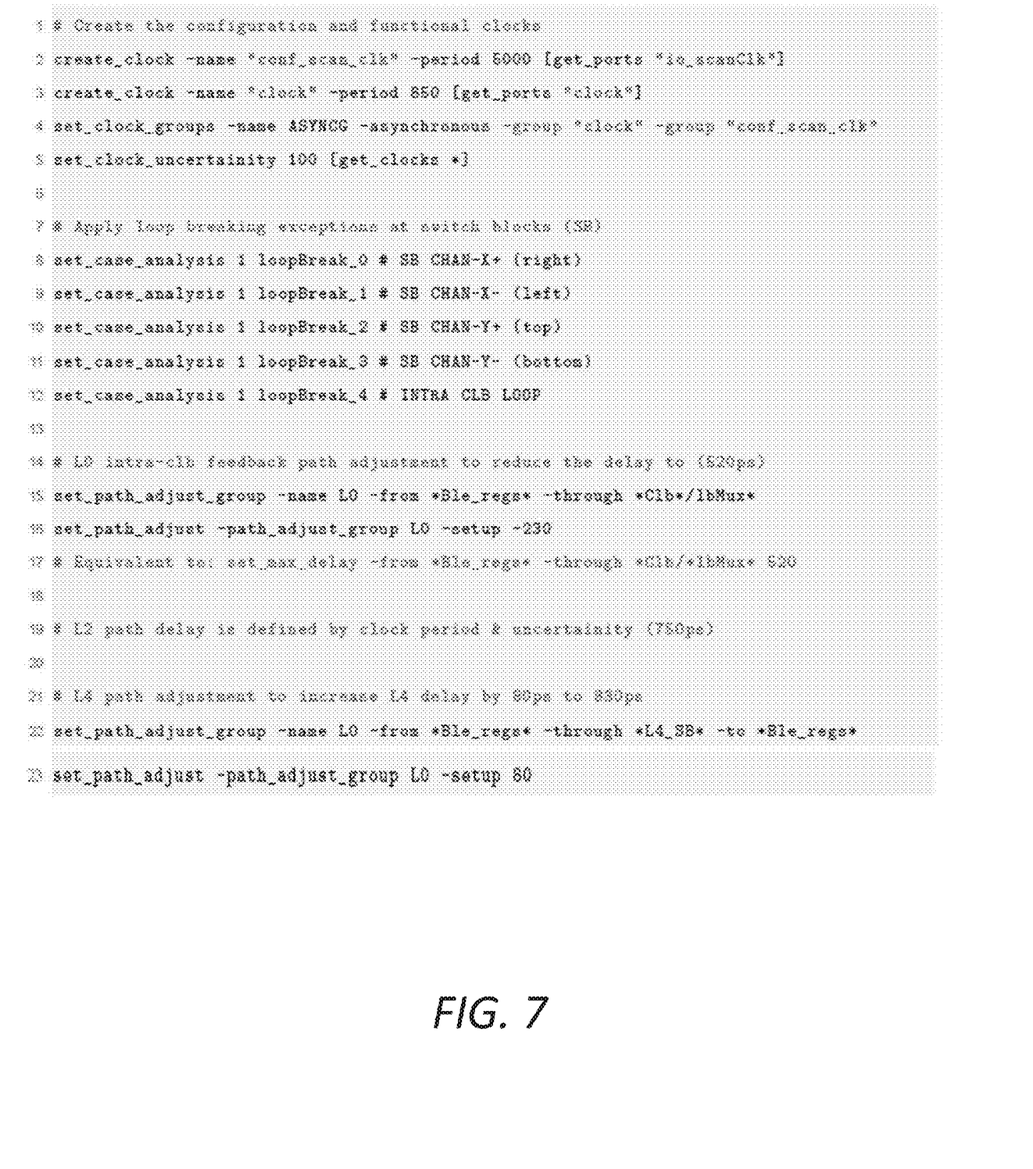
FIG. 7 is a listing showing a timing constraints file for optimizing the exemplary 10×10 eFPGA fabric.

Timing Constraints for eFPGA Optimization—Before running logic and physical synthesis, the timing constraints and exceptions need to be provided to the EDA tools per our proposed top-down methodology. The listing shown in FIG. 7 shows some important constraints used to optimize 10×10 eFPGA fabric. The timing constraints file defines two clocks, one for the BLE registers and the other for the configuration scan chains, and specifies them as asynchronous clocks. Intra-tile and inter-tile loops in the fabric are broken using the case analysis statements (lines 8-12). After breaking the loops, there are three possible paths between any two given BLE registers with different lengths. These three paths are listed below.

L0 path: Starts at the BLE register, passes through the internal CLB feedback path in the cross-bar, and ends in a BLE register. This is the shortest path delay to the BLE register. The total delay of Th L0 path can be expressed as:

$$L0_{delay} = \sum T_{clk-q} + T_{feedback\_mux} + T_{x-bar} + T_{lut} + T_{setup} \quad (1)$$

L2 path: Starts at the BLE register, exits the CLB through a L2 switch block, passes through L2 wire segment, enters another CLB through a connection block, and ends in a BLE register inside the tile. The total delay of the L2 path can be expressed as:

$$L2_{delay} = \sum T_{clk-q} + T_{opin-mux} + T_{L2_{SB}\&wireload} + T_{CB} + T_{x-bar} + T_{lut} + T_{setup} \quad (2)$$

L4 path: Starts at the BLE register, exits the CLB through an L4 switch block, passes through the L4 wire segment, enters another CLB through a connection block, and ends in a BLE register inside the tile. Note that the L4 wire segment drives the CLB at the beginning and end of the wire segment and does not connect to the tiles in the middle. This helps the L4 semi-global paths achieve similar delays to the local L2 paths, though they span twice the length. The total delay of an L4 path can be expressed as:

$$L4_{delay} = \sum T_{clk-q} + T_{opin-mux} + T_{L4\_SB\&wireload} + T_{CB} + T_{x-bar} + T_{lut} + T_{setup} \quad (3)$$

The timing constraints presented here, along with the modified switch block mux, solves all the three significant timing challenges presented in Section. They help break the loops, prevent timing path explosion by restricting the timing paths to the longest wire segment present in the fabric, and divide the eFPGA into regular chunks of paths with similar uniform delays (L0, L2, and L4) to provide the regularity in delay that the FPGA CAD tools assume for their algorithms. The only portion of the fabric that is not explicitly constrained are the turns inside of the switch block in each tile. For reducing the delay on these paths, the PnR tools are instructed to group the switch block muxes together. The timing constraints will also dictate the buffering and placement of the tiles in the eFPGA without any manual intervention, unlike the bottom-up method.

Logic Synthesis-Logic synthesis can be performed using the RTL and SDC previously described using the industry-standard Stylus flow using Cadence Genus 20.12 EDA tool. Before synthesis could be run, another problem with combinational loops caused by how the tool reads in the design required solving. When the synthesis tool reads the netlist, the constraints are not applied immediately. The synthesis tool attempts to create a timing graph of the design and then apply the constraints on this graph. When it tries to create the timing graph of the eFPGA, the tool runs into combinational loops. Since the tool cannot run on a timing graph with loops, it runs an internal algorithm for breaking the loops. As the size of the fabric increases, this algorithm takes longer and longer to execute. To overcome this problem, the loop-breaking muxes were converted into timing black boxes so that there is no timing path through these muxes. Therefore, when the tool tries to create a timing model without the constraints, there are no loops, and the process finishes almost instantly. After the loop-breaking constraints are, we swap the black-box with a regular 2:1 mux for optimization.

Figure 8:
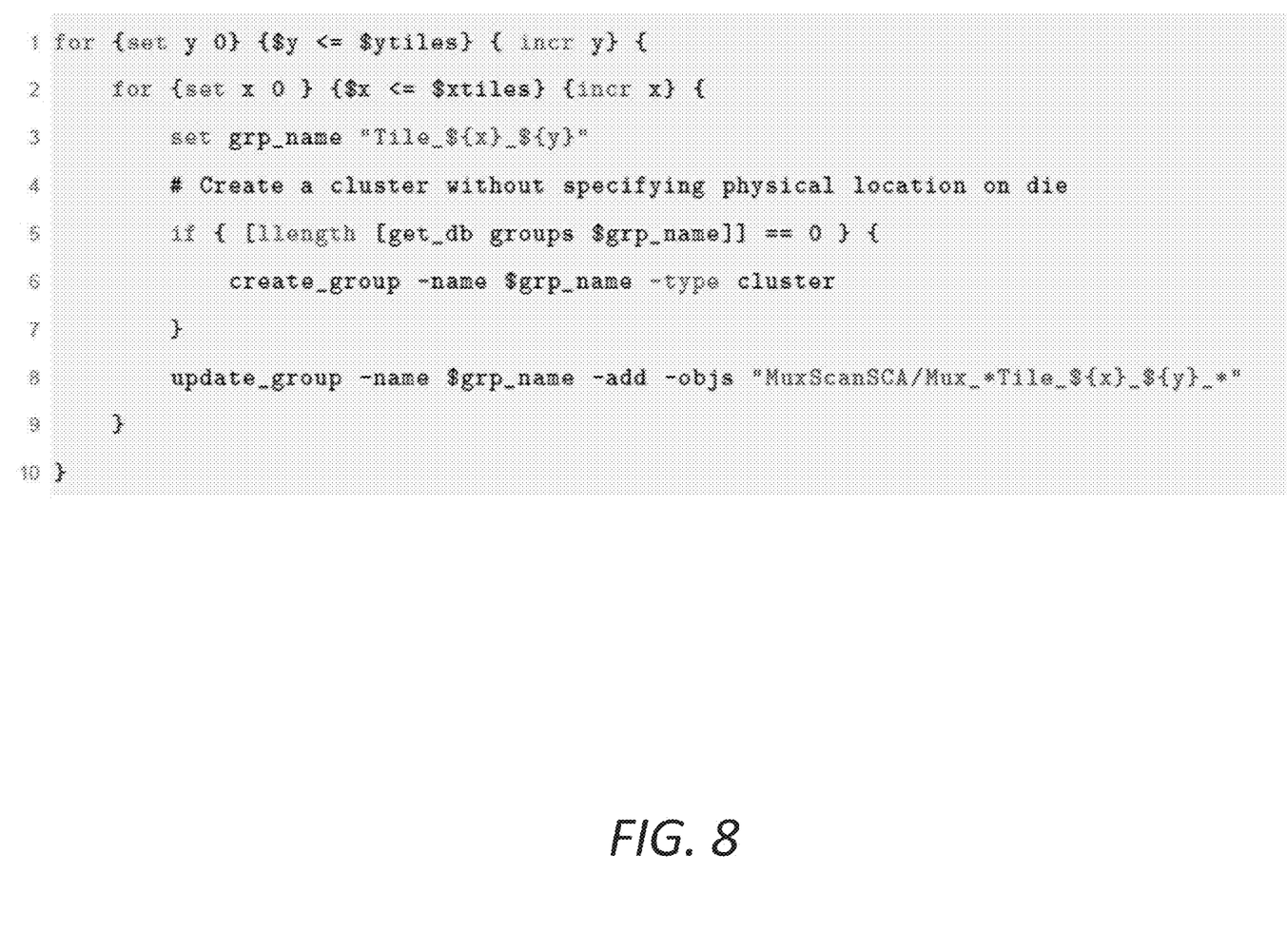
FIG. 8 is a listing showing a TCL script used for location agnostic grouping of switch block multiplexers.
Figure 9:
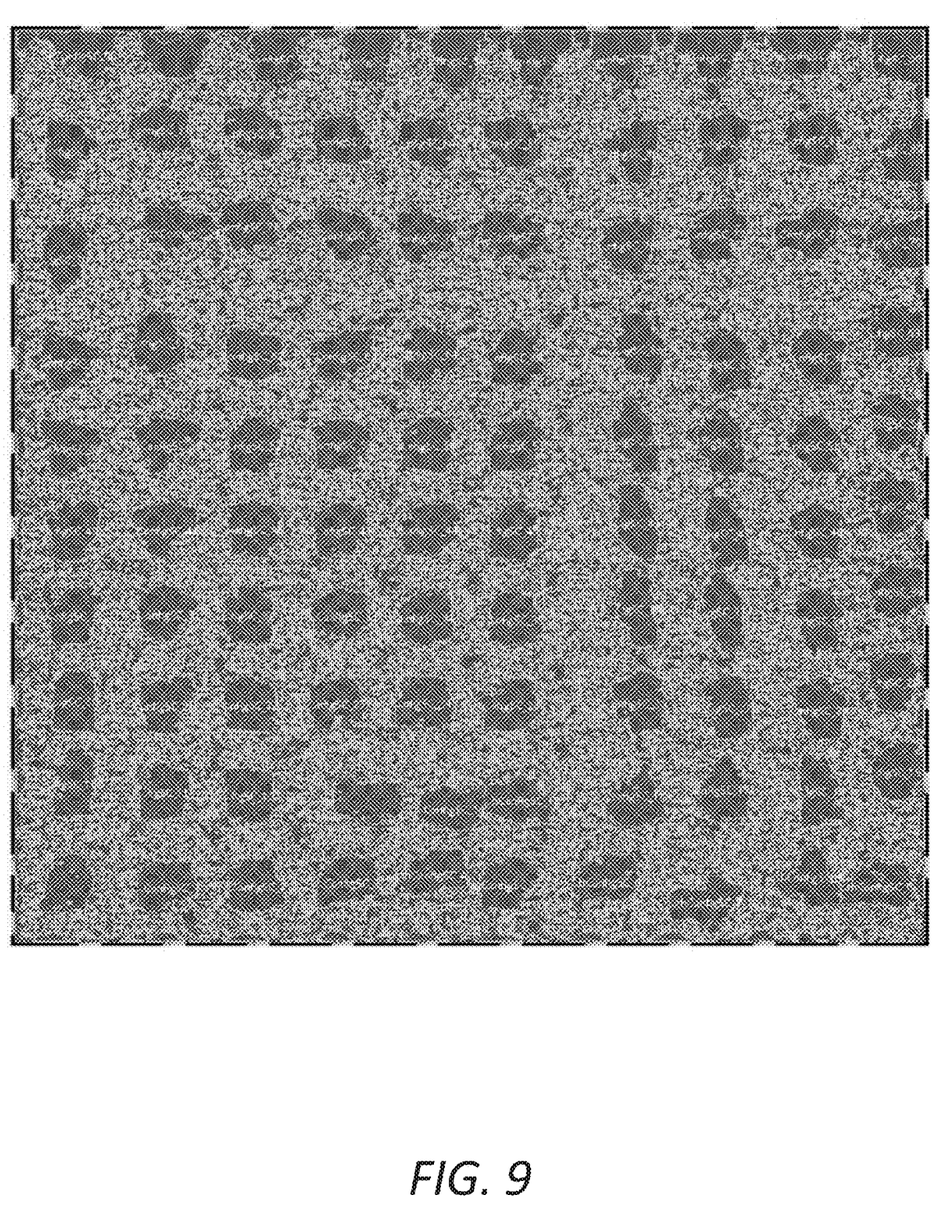
FIG. 9 is an illustration of the layout capture of the automatically placed exemplary 10×10 eFPGA fabric with named logic block hierarchies.
Figure 10A:
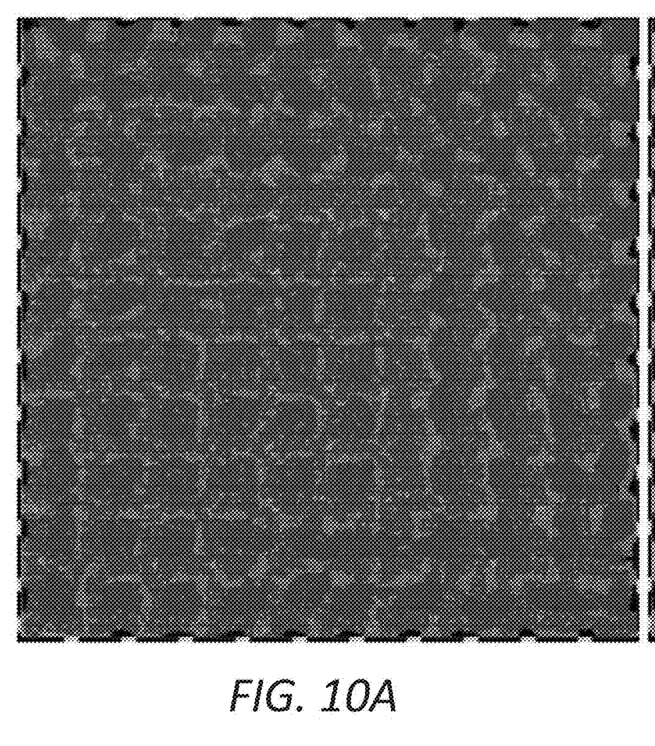
FIG. 10(a) shows the placement of logic blocks of the exemplary 10×10 FPGA fabric.
Figure 10B:
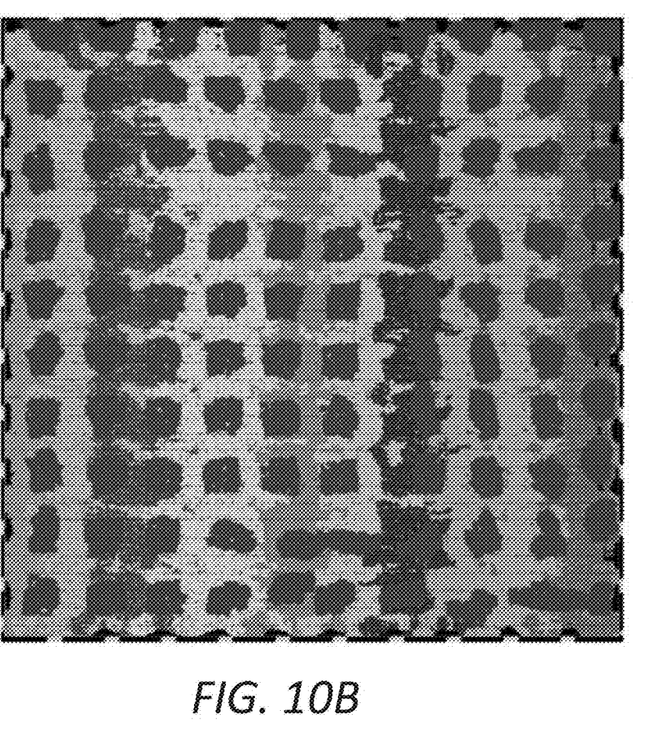
FIG. 10(b) shows a placement of the connection block and switch block multiplexers in each column of the FPGA grid.

Floorplanning & Placement—In the floorplan stage, the block's dimensions need to be defined and the IO pins need to be placed in the required locations. The block's dimensions can be estimated using the area reports generated during synthesis. The estimation should consider two overheads. First, during physical design phases such as placement, CTS, hold fixing, and post route optimization, the tool will insert buffers and resize the cells. The second is maximum utilization of a design in a given technology. The utilization value depends on various factors such as routing congestion, power consumption, requirements on local decoupling capacitors, post-layout ECO changes, etc. Typically utilization is around 80-90% of the area allocated during floorplanning. Utilization can be increased or decreased depending on the routing congestion. Considering the synthesis area and the physical design overheads, the dimensions of the 10×10 eFPGA fabric were estimated as 0.54 mm×0.54 mm. While running the placement step, we need to instruct the tool to cluster the SB muxes of a tile to reduce the delay on the turns. To facilitate this, the our RTL generator adds the tile XY information to the name of all the routing muxes in the fabric. Therefore, a simple TCL script shown in the listing in FIG. 8 is used to accomplish this task. The connection and logic blocks can also be added to this group if necessary. FIG. 9 shows the placement of all the logic blocks in the eFPGA fabric. FIG. 10A shows the placement of the logic blocks (blue), I/O blocks (black), switch blocks (magenta), and connection blocks (green) by the EDA tool. Connection blocks surround the logic blocks, and the switch blocks surround both the connection blocks and logic blocks which corresponds with the expected locations of these modules. FIG. 10B shows the placement of the connection block and switch block multiplexers in each column of the FPGA grid highlighted in different colors, showing the regularity of placement.

Figure 11A:
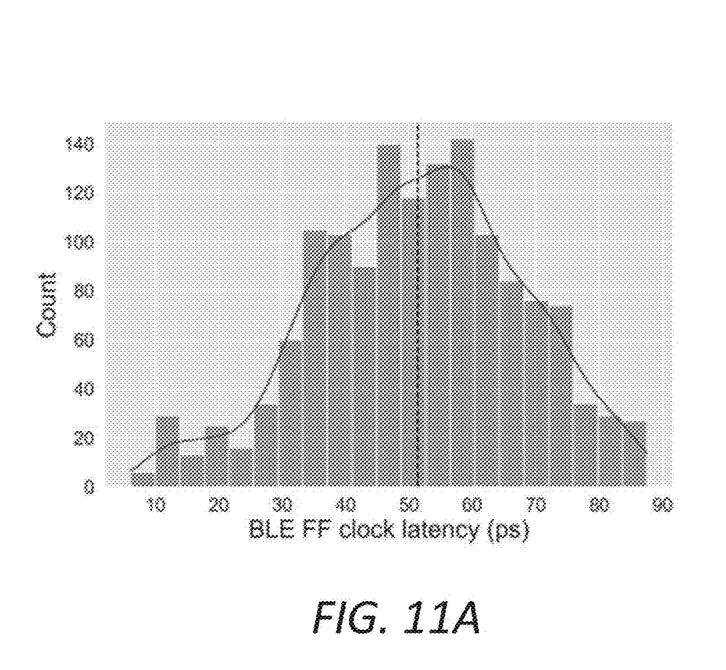
FIGS. 11A and 11B are histograms showing BLE FF clock latency and the configuration clock latency, respectively.
Figure 11B:
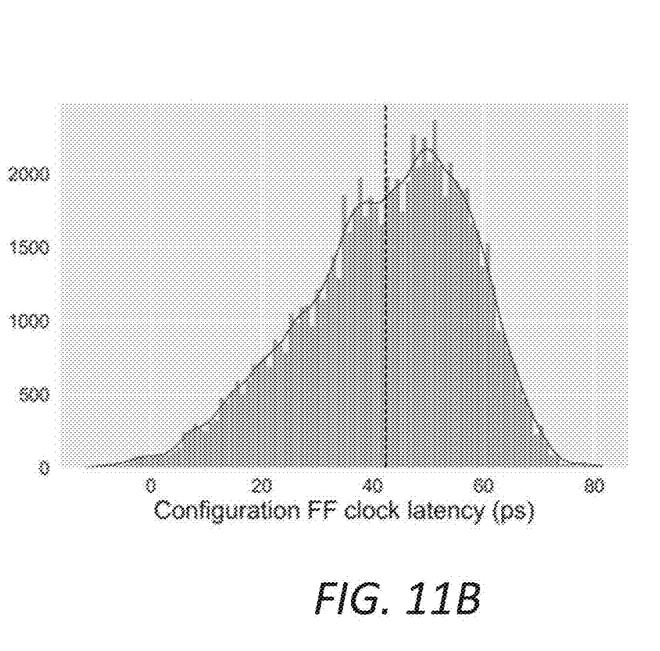

CTS & Post-CTS Optimization—The next step in the physical synthesis flow is to build the clock trees to distribute the clocks to the BLE registers and the configuration registers. The most critical metric in the CTS stage is clock skew. The default clock tree synthesis option in the Innovus EDA tool uses concurrent clock optimization (CCOPT) technology, which explicitly introduces skews the clock tree to fix setup violations by opportunistically borrowing time from other register stages. This is not desirable for the FPGA fabric as it is highly regular and any clock skew will adversely affect one path while benefiting another path. For the 10×10 eFPGA, we have 800 BLE registers, and 72K configuration registers on two different clocks. FIGS. 11A and 11B show the histogram of clock latency to all the configuration registers (FIG. 11A) and BLE registers (FIG. 11B). These show that the maximum latency difference is around 100 ps. Note that the latency difference shows the arrival times of clock signals for all the registers and does not correspond to skew, which is the difference between the arrival times between two registers with a valid timing path. The maximum skew value reported by the EDA tools for functional clock and configuration clock is 75 ps and 73 ps, respectively.

After clock tree synthesis the tools run a postcts optimization step to fix all the hold violations introduced due clock skews. For the eFPGA, most of the hold violations are in the configuration scan chain due to the lack of logic between the registers. During the postcts hold optimization, the tool inserts 45K buffers to fix the hold violation on the scan chains. This amounts to around 0.6 hold buffers for every configuration flop. Though, the hold buffers are large in number, their area is less than ⅕th of the configuration register and hold buffers inserted account for 3.6% of the total area.

Figure 12A:
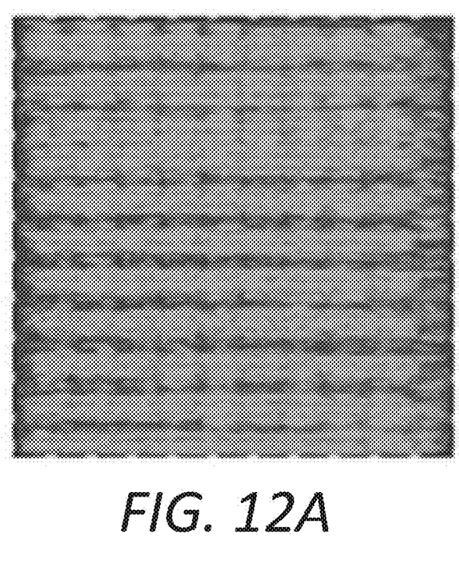
FIGS. 12A and 12B show a signal routing map of the exemplary 10×10 eFPGA fabric.
Figure 12B:
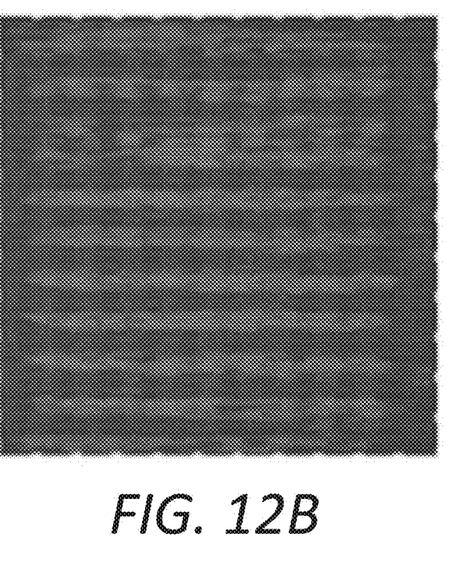
Figure 12C:
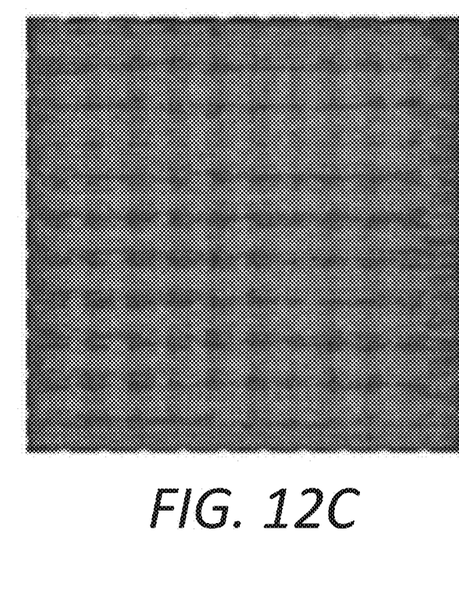
FIGS. 12C and 12D show the congestion map of the exemplary 10×10 eFPGA fabric.
Figure 12D:
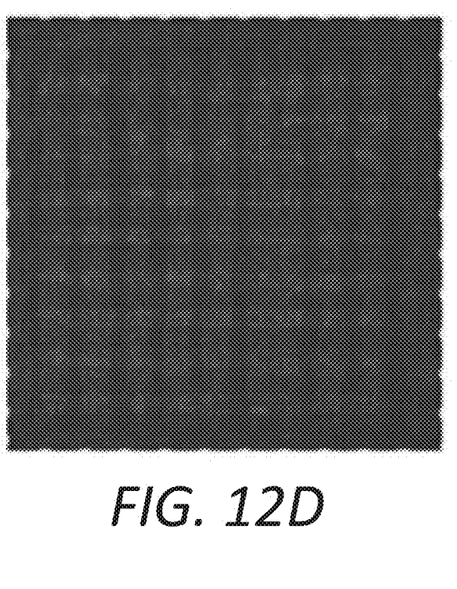

Route & Post-Route Optimization—The final step in the physical design process is to route the design and run a another round of timing optimization to fix the timing violations introduce due to routing. FIGS. 12A and 12B show the routing channels of the fabric in the top four signal routing layers. The figures show that there is very little routing in the top two metal layers (7/8) and the routing has very little congestion on the next two metal layers (5/6). Moreover, the density after postroute is 91%, which is already at the limits for typical ASIC designs, which indicated that the low congestion is arising due to under utilization.

The patterns of routing in these four layers predominantly resemble the channel routes, especially for metal layers 7 and 8. From this it can be inferred that that most of the local routing (configuration routing, xbar, LUT, etc.) are mostly metal layers 2 and 4, with some portions spillage in layers 5 and 6. This leaves ample room to increase the channel width of the FPGA architecture if necessary. In the context of an eFPGA, low routing utilization is desirable because, this allows the soft eFPGA can be integrated into the RTL without the worrying about routing congestion caused by the eFPGA itself or routing from other SoC blocks that have to pass through the eFPGA.

Timing Sign-Off-Timing sign-off checks ensure proper functionality and performance of the ASIC design after physical implementation. The most commonly performed checks in the timing sign-off flow are hold and setup checks. There are other checks like timing design rule violation, clock pulse width, glitch, etc. But hold and setup checks are the most important because these checks are fundamental to ensure proper functionality and performance. Hence, our focus will focus on the hold and setup checks.

Hold: For the eFPGA fabric, the hold violations on the configuration FFs and BLE FFS, clocked by the configuration clock and the functional clocks, respectively must be verified. Hold verification of the configuration chain is straightforward as all the paths are visible to the timing tool, and the timing reports generated using timing sign-off tools like Tempus can be used for signoff. However, this is not the case for the BLE FFs. Due to the existence of combinational loops in the fabric that need to be disabled, the timing paths do not span all the FFs in the design, and hence hold timing cannot be verified directly like in other ASIC designs. Using the top-down methodology, hold violations between flops on all the logic blocks that drive tap from an L2 or L4 channel wire can be checked. This will include checks for all BLE FFs inside of a CLB and BLE FFs up to 3 tiles away in the X and Y directions. But this still does not exhaustively verify for hold violations between all the flops in the fabric. Therefore an alternate methodology is required. The requirement for hold timing between two registers in a design is given by:

$$T_{clk-q} + T_{comb-path} > T_{skew} + T_{hold} \quad (4)$$

If it can be shown that the condition in Eq. (4) holds for all the BLE FFs in the FPGA, then the fabric will not have any hold violations. When applications are implemented in the eFPGA fabric, there can be a timing path from any FF in a logic block to any other FF in the entire eFPGA. To consider all the flops in the eFPGA the Eq. (4) has to be modified to Eq. (5) (i.e., to verify that the minimum path delay between any of the FFs in the eFPGA fabric is greater than the maximum skew and maximum FF hold time). These values can be easily obtained for the eFPGA fabric from the timing sign-off tools.

$$T_{min-clk-q} + T_{min-comb-path} > T_{max-skew} + T_{max-hold} \quad (5)$$

The maximum possible skew between any two FFs in the eFPGA can be easily obtained using the max and min clock latency plotted in the latency histogram. The hold time of all the flops can also be obtained directly from the timing sign-off tool. For the 10×10 eFPGA, the maximum hold time was 20.5 ps, and the maximum difference in latency was 76.4 ps. For the eFPGA to pass hold checks, the sum of minimum clk-q and the shortest combinational path delay must be greater than 96.9 ps. The shortest path between two FFs in the eFPGA is the L0 path, and the minimum datapath delay of all the L0 paths in the eFPGA reported by the tool is 144.5 ps. Note that the L2 and L4 paths will have more significant delays than the L0 path, and any path that has to take a turn will have an even larger delay. By obtaining the latency, hold times, and shortest path delays from the timing tool, we can guarantee that the eFPGA fabric will be free from hold violations as constructed. This means that the FPGA CAD tools do not have to worry about fixing hold timing.

Setup: Setup timing is less critical than hold timing because setup timing will only affect the maximum operating frequency and not the functionality. Timing paths between the registers in an ASIC design is already defined by the circuit connectivity and the timing constraints at the time of fabrication. But the timing paths on the eFPGA will be dynamically decided by the application that runs on eFPGA and is not known at the time of fabrication. Hence, there is no direct clock specification that can be used to verify the setup timing of the eFPGA fabric at design time. But, when the application is mapped to the eFPGA, the paths are well defined, and hence we should be able to identify the setup path and determine the maximum operating frequency. There are two steps involved in this process: (1) Use the FPGA CAD tool (VTR in this case) to map the application & generate the bitstream; and (2) Use the bitstream to obtain the maximum operating frequency of the mapped application.

For timing-driven placement and routing, the FPGA CAD tools typically assume some form of regularity in the delay of logic blocks and wire segments. In the next section, we will analyze the path delay regularity of the eFPGA fabric in detail. But, the more important point is that we are not using the FPGA CAD tools directly for signoff. We use the CAD tool to generate the bitstream and then annotate that bitstream onto the ASIC timing signoff tools to determine the maximum operating frequency. Therefore, it is important to faithfully annotate the relative delays of the routing switches and primitives in the eFPGA. The delay values used for annotation do not matter in this context.

Suppose there is a requirement not to use the ASIC CAD tools for application signoff timing. In that case, all the timing arcs in the VPR rrgraph can be extracted and saved in a database for reporting the delay for calculating the maximum operating frequency. At the current moment, to the best of our knowledge rrgraph edges cannot be annotated with separate delay values in VPR.

As would be realized by one of skill in the art, the disclosed systems and methods described herein can be implemented by a system comprising a processor and memory, storing software that, when executed by the processor, performs the functions comprising the method.

As would further be realized by one of skill in the art, many variations on implementations discussed herein which fall within the scope of the invention are possible. Specifically, many variations of the architecture of the model could be used to obtain similar results. The invention is not meant to be limited to the particular exemplary model disclosed herein. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method for performing top-down design of an FPGA fabric comprising an array of configurable logic blocks interconnected with a plurality of switch box multiplexers switching inputs to the configurable logic blocks and channels connecting the configurable logic blocks, the method comprising:
generating a layout of the FPGA fabric from an architecture specification, the layout including a routing resources graph describing a layout of and interconnections between a plurality of configurable logic blocks in the FPGA;
identifying the switch box multiplexers in the layout; and
restructuring one or more of the switch box multiplexers to partition inputs to the configurable logic blocks and channels between the configurable logic blocks into separate multiplexers, wherein channel-to-channel paths are blocked or enabled based on one or more case analysis exception bits.

2. The method of claim 1 wherein the restructured switch box multiplexers accept loopbreak signals for each routing channel direction to break circuit level loops by applying a logic value.

3. The method of claim 1 further comprising:
generating placement and routing information for the design of the FPGA; and
determining, from the placement and routing information, configuration bits for the switch box multiplexers.

4. The method of claim 1 further comprising:
organizing the configuration bits into a bitstream;
generating an RTL description of the FPGA from the layout; and
verifying the RTL description using the bitstream.

5. The method of claim 1 wherein the case analysis exception bits filter timing paths through the channels.

6. The method of claim 5 further comprising:
clustering the switch box multiplexers associated with a configurable logic block close to each other.

7. The method of claim 3 further comprising:
deriving a netlist of look-up tables and flip-flops;
wherein the placement and routing information is generated based on the netlist.

8. The method of claim 3 wherein the placement and routing information is generated by VPR using the netlist as input.

9. A system comprising:
a processor; and
memory, storing software that when executed by the processor, implements a fabric generation tool that executes the method of claim 1.

10. The system of claim 9 wherein the fabric generation tool outputs STA constraints and hardware description language for use as input to standard ASIC synthesis tools.

11. The method of claim 1 further comprising:
generating the one or more case analysis exception bits.

* * * * *